3,190,863
REACTION PRODUCTS OF DECABORANE WITH ALKENYL PYRIDINE
Joseph Green, Dover, N.J., and Barney Groten, West Lafayette, Ind., assignors to Thiokol Chemical Corporation, Bristol, Pa., a corporation of Delaware
No Drawing. Filed Nov. 15, 1960, Ser. No. 69,518
7 Claims. (Cl. 260—88.3)

This invention relates to solid reaction products of decaborane or a lower alkyl decaborane with a lower alkenyl pyridine.

The solid reaction products of this invention are prepared by reacting decaborane or a lower alkyl decaborane with a lower alkenyl pyridine.

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in application Serial No. 497,407, filed March 28, 1955, now Patent No. 2,999,117, by Elmar R. Altwicker, Alfred B. Garrett, Samuel W. Harris, and Earl A. Weilmuenster.

Suitable lower alkenyl pyridines include 2-vinyl pyridine, 3-vinyl pyridine, 2-methyl-5-vinyl pyridine, 2-propenyl pyridine, and 2,2-dipyridylethylene.

The ratio of reactants can be varied widely, generally being in the range of 0.1 to 10 moles of decaborane or alkyl decaborane per mole of alkenyl pyridine. The retcation temperature can vary from 0° C. to 120° C. and the pressure can vary from subatmospheric to several atmospheres. The reaction to go to completion generally requires from 0.5 to 24 hours depending upon the ratio of reactants, the particular reactants utilized, and the temperature and pressure employed.

Although the reaction will proceed in the absence of a solvent, best results are obtained, especially where solid reactants are employed, by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but generally ranges up to about 70 times the weight of the reactants. When a solvent is employed, it is preferred to carry out the reaction at the reflux temperature of the solvent.

The process of the invention is illustrated in detail by the following example:

*Example*

5.25 grams (0.05 mole) of 2-vinyl pyridine in 75 milliliters of benzene were added to 12.2 grams (0.1 mole) of decaborane in 200 milliliters of benzene at room temperature in a 500 cc. round bottom flask equipped with a thermometer, a stirrer and a reflux condenser. The reaction mixture was then heated to reflux temperature (about 81° C.) and refluxed for 20 hours, during which time solids gradually precipitated. The reaction mixture was then filtered to remove the solids and the solvent was removed from the filtrate in vacuo. A dark red gum remained. The gum residue was washed with cyclohexane and dried to yield a red-orange thermoplastic powder. An infrared analysis of the powder showed negligible absorption in the vinyl double bond region.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without distintegration when ignited by conventional means, such as a pyrotechnic type igniter, and are mechanically strong enough to withstand ordinary handling.

We claim:

1. A process for the preparation of solid polymeric reaction products of boranes and alkenyl pyridines which comprises reacting a borane selected from the class consisting of decaborane and a lower alkyl decaborane with a lower alkenyl pyridine.

2. The process of claim 1 wherein the reaction is carried out while the reactants are in admixture with a solvent inert with respect to the reactants.

3. The process of claim 1 wherein the borane is decaborane.

4. The process of claim 1 wherein the lower alkenyl pyridine is 2-vinyl pyridine.

5. The process of claim 2 wherein the borane is decaborane, wherein the lower alkenyl pyridine is 2-vinyl pyridine, and wherein the solvent is benzene.

6. Solid products produced by the process of claim 1.

7. Solid products produced by the process of claim 5.

No references cited.

JOSEPH L. SCHOFER, *Primary Examiner.*

L. D. ROSDOL, R. L. CAMPBELL, SAMUEL BOYD,
*Examiners.*